W. A. EASTIN.
Corn-Planters.
No. 134,984.  Fig. 1.  Patented Jan. 21, 1873.
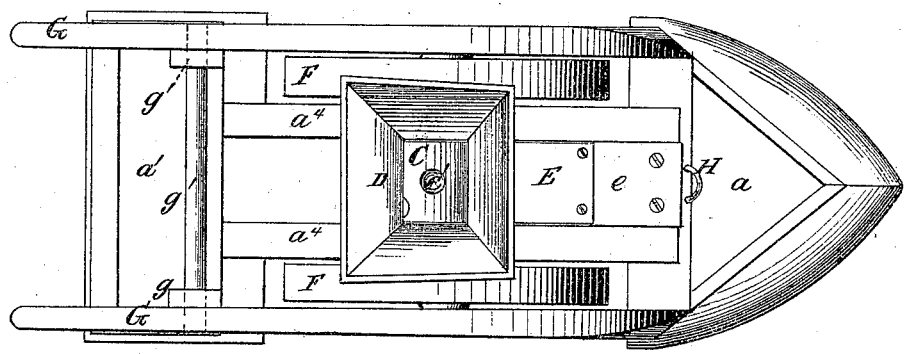
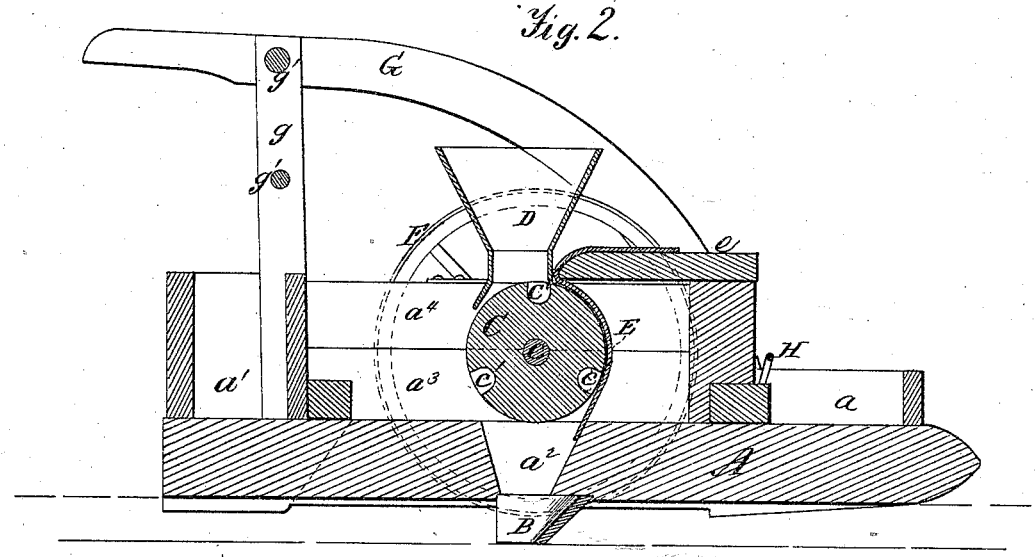
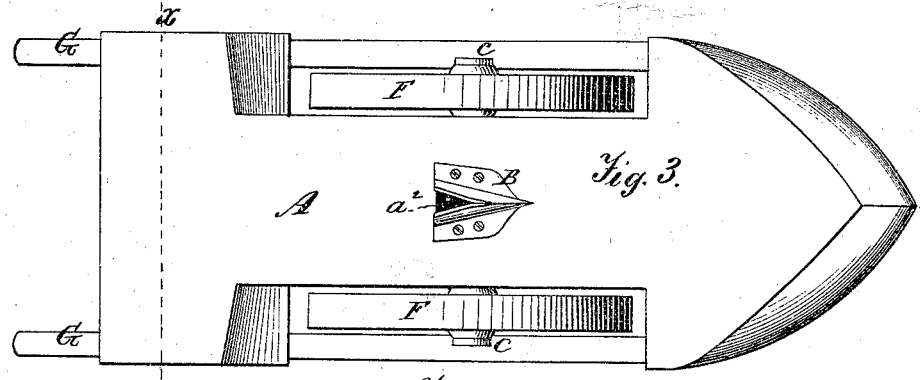
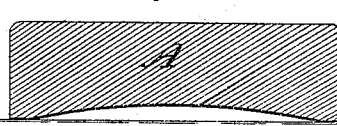
Witnesses.
A. Ruppert.
Wm. M. Lynch
Inventor.
Wm. A. Eastin
Edson Bros.
attys

UNITED STATES PATENT OFFICE.

WILLIAM A. EASTIN, OF HENDERSON COUNTY, ASSIGNOR TO W. L. RANKINS, OF PARIS, KENTUCKY.

IMPROVEMENT IN CORN-PLANTERS.

Specification forming part of Letters Patent No. 134,984, dated January 21, 1873.

*To all whom it may concern:*

Be it known that I, W. A. EASTIN, residing in the county of Henderson and State of Kentucky, have invented a certain Improvement in Combined Corn-Planters and Tobacco-Hill Makers, of which the following is a specification:

In the annexed drawing, Figure 1 is a plan view, Fig. 2 a longitudinal central vertical section, and Fig. 3 an under-side view, of my improved combined corn-planter and tobacco-hill maker. Fig. 4 is a transverse section of the same taken through the dotted line $x\,x$ of Fig. 3, exhibiting the concavity of the hill-maker.

Like parts in the several figures are designated by corresponding letters.

This invention relates to an improved combined corn-planter and tobacco-hill maker; and it consists of the corn-dropping cylinder, which is supplied upon its face with diagonal parallel rows of feeding or dropping cavities, the corn or seed being properly retained within said cavities while being fed to the furrow by means of a flat metallic spring or plate; and, further, of the device for making or forming the tobacco-hill, substantially as hereinafter more fully specified and particularly pointed out in the claims.

To enable others to make and use my invention, I will proceed to describe it.

The coverer or hill-maker A is of an oblong shape, supplied with a pointed and beveled forward end, and constructed upon its lower side with a concavity, as shown in the drawing, the object of which being to enable it, as drawn over the plowed ground, to create a hill such as is suitable for the growing of tobacco, &c., the manner of making said hill not being deemed necessary to be described, as such is apparent at a glance at the working of the machine. The concavity of this device is designed to be lined with sheet metal, whereby the wood of the said device will be protected from wear and tear in passing over the ground. Upon the laterally-extended portions or front and rear ends of the said hiller A are placed boxes $a\,a^1$, which are for the purpose of receiving and holding weight to make the said hiller as heavy as possible, so as to enable it to properly perform its work of making the hill. Through the hill-maker A, at or about its center, is cut the corn or seed dropping opening $a^2$, around which, and to the lower side of the said hill-maker, when the machine is to be used as a corn-planter, a plow-shovel, B, of suitable construction, is fastened in the ordinary way. The dropping-cylinder C is journaled directly above the opening $a^2$, upon an axis, $c$, having its bearings upon the surface of the upper edge of the sides of hill-maker A, the said axis being clamped down thereon through additional side pieces $a^4\,a^4$. This cylinder, which is for the purpose of taking the corn or seed from the hopper and conveying it to the opening $a^2$, through which it will be dropped into the furrow made for its reception, is provided upon its face with a series of cavities, $c'\,c'$, which receive the corn to be dropped, and which are arranged thereon in parallel rows running diagonally to the said face of cylinder. Through this arrangement of the said cavities the corn or seed will be dropped in diagonal rows equidistant apart, whereby the corn or seed will be uniformly deposited in the furrow or ground. D is the hopper for the reception of the seed or corn, which is fastened in any suitable manner and by the proper means to the machine, directly above the dropping-cylinder C. E is a spring-metal plate, which is fastened at its lower end to the side of the opening $a^2$, and thence passed upward in the arc of a circle so as to rest against the face of the dropping-cylinder C, after which it is fastened to a block of wood, $e$, resting upon or fastened down to the upper surface of the side bars $a^4\,a^4$. The object of this plate is to keep the seed within the cavities of the cylinder C while being dropped until the same has reached the discharge-opening $a^2$. F F refer to the transporting-wheels, which also act as the driving-wheels, they being attached rigidly to the axis of the cylinder C rotating with the said axis. G G refer to the handles of the machine, which are to be grasped when the same is in operation. These handles are fastened directly at their forward ends to the machine by any suitable means, and at their rear ends, or thereabout, through the standards $g\,g$, which are braced together by means of the bars $g'\,g'$. The animals are hitched to the machine at the point.

Having thus described my invention, what

I claim, and desire to secure by Letters Patent, is—

1. The tobacco-hill maker A, having a concavity in its lower side, in combination with the wheels F F, axis $c$, and handles G G, substantially as set forth.

2. The combination of the cylinder C $c'$, plate E, axis $c$, wheels F, hopper D, tobacco-hill maker A $a^3$ $a^4$, plow B, and handles G, substantially as and for the purpose set forth.

In testimony whereof I have hereunto signed my name this 29th day of August, A. D., 1872, in presence of two subscribing witnesses.

W. A. EASTIN.

Witnesses:
S. B. VANCE,
THOS. F. CHEANEY.